US008027285B1

(12) United States Patent
Eyyunni et al.

(10) Patent No.: US 8,027,285 B1
(45) Date of Patent: Sep. 27, 2011

(54) METHOD TO ELIMINATE FREQUENCY OFFSET INTRODUCED IN A NETWORK

(75) Inventors: Venugopal Eyyunni, Centreville, VA (US); Christopher Donald Gregory, Potomac Falls, VA (US); Conor Foley, Sterling, VA (US)

(73) Assignee: VT iDirect, Inc., Herndon, VA (US)

( * ) Notice: Subject to any disclaimer, the term of this patent is extended or adjusted under 35 U.S.C. 154(b) by 958 days.

(21) Appl. No.: 11/763,986

(22) Filed: Jun. 15, 2007

(51) Int. Cl.
*H04B 7/14* (2006.01)
(52) U.S. Cl. ....... 370/315; 455/13.1; 455/13.2; 455/430
(58) Field of Classification Search .............. 455/12.1, 455/8, 71, 427; 370/321
See application file for complete search history.

(56) References Cited

U.S. PATENT DOCUMENTS

| | | | | |
|---|---|---|---|---|
| 4,947,451 A | * | 8/1990 | Nawata | 455/8 |
| 5,471,657 A | * | 11/1995 | Gharpuray | 455/12.1 |
| 5,757,784 A | * | 5/1998 | Liebowitz et al. | 370/321 |
| 6,356,740 B1 | * | 3/2002 | Malcolm et al. | 455/71 |
| 2002/0013149 A1 | * | 1/2002 | Threadgill et al. | 455/427 |
| 2005/0147196 A1 | * | 7/2005 | Quilter et al. | 375/356 |
| 2006/0105702 A1 | * | 5/2006 | Muth et al. | 455/2.01 |

OTHER PUBLICATIONS

U.S. Appl. No. 11/764,004, filed Jun. 15, 2007, Foley et al.
U.S. Appl. No. 11/764,020, filed Jun. 15, 2007, Foley et al.

* cited by examiner

*Primary Examiner* — Lester Kincaid
*Assistant Examiner* — Isaak R Jama
(74) *Attorney, Agent, or Firm* — Oblon, Spivak, McClelland, Maier & Neustadt, L.L.P.

(57) ABSTRACT

A remote, a communications system, and a method in which the remote communicates with another remote via a repeater and also communicates with a hub. The remote includes a transceiver configured to receive a signal from the another remote, a measuring unit configured to measure a first offset, and a calculation unit configured to calculate a frequency offset for the signal based on (i) the first offset measured at the measuring unit, and (ii) a second offset measured at the hub.

13 Claims, 8 Drawing Sheets

METHOD TO ELIMINATE FREQUENCY OFFSET INTRODUCED IN A NETWORK

BACKGROUND OF THE INVENTION

1. Field of the Invention

The present invention is related in general to the field of communications and specifically to frequency offset in a satellite network.

2. Discussion of the Background

Satellite communication systems are capable of providing telephone and broadband data communications over a large geographical area. A satellite may be used to form a network so that two or more remote terminals can communicate with each other by relaying the information over the satellite. Two common types of satellite networks are star networks and mesh networks.

FIG. 1 shows an exemplary form of a star satellite network. A star network usually has a central terminal, such as hub 110. In a star network, remote terminals, such as terminals 111 and 112, can communicate with the hub 110 through the satellite 100. In order for one remote terminal, to communicate with another remote terminal, the data must first pass through the hub 110, requiring two relays (or "hops") through the satellite 100.

FIG. 2 shows an exemplary form of a mesh satellite network. In a mesh network, remote terminals, for example remote terminals 111 and 112, are capable of communicating directly with other remote terminals via the satellite 100.

In order for a communications receiver to demodulate the information from a received signal, it is often helpful for the receiver to have an accurate estimate of the signal frequency. When a receiver is tuned to a frequency that is not the same as the frequency of the received signal, a frequency offset error can exist. If this offset is too large, it may not be possible to reliably recover data from the signal. A manner of providing a more accurate frequency estimate may reduce the need for further frequency tracking or estimation by a receiver, potentially reducing the cost and complexity of the receiver. Additionally, a more accurate frequency estimate could allow for the performance of the receiver to be improved.

Satellite systems often have significant sources of frequency offset error that can degrade communications performance or increase the cost of a satellite network. Many components of the satellite network, such as upconversion equipment, downconversion equipment and the satellite transponder, can translate the frequency of a signal to accommodate various physical and regulatory requirements. When each component that translates the signal does not utilize same frequency reference source, each translation may produce a frequency offset that contributes to an overall frequency offset error between the receiver's tuned frequency and the actual received signal frequency. Frequency offset errors may also be caused by temperature fluctuations of electrical equipment or environmental conditions.

In star networks, the hub can be used to simplify network operation and lower cost of the network. The hub may assist each terminal in communicating with the hub by providing the terminals with network control and status information. This information may include a time reference, a frequency reference, measured frequency offset information, measured time offset information, and other information that can improve the performance and lower the cost of the terminals.

Mesh networks, however, which require only one satellite hop for remote to remote communication, may operate with only approximately half of the transmission delay found in remote to remote transmissions of star networks. Transmission delay can have an adverse effect on telephony and other applications using the satellite network. Additionally, mesh networks can reduce the cost of satellite access because the information only passes through the satellite once.

Mesh networks, however, may have terminals operating using different time and frequency reference sources. This may result in time offsets and frequency offsets that can degrade the performance of the network and make it difficult for remote terminals to communicate with one another.

SUMMARY OF THE INVENTION

In one exemplary embodiment a system for communications is described. The system. The communication system includes a hub, a repeater; and first and second remotes. The first remote is configured to calculate a frequency offset, for receiving a signal from the second remote via the repeater, based on (i) a first offset measured at the first remote, and (ii) a second offset measured by the hub.

In another exemplary embodiment, a remote that communicates with another remote via a repeater and also communicates with a hub is described. The remote includes a transceiver configured to receive a signal from the another remote, a measuring unit configured to measure a first offset, and a calculation unit configured to calculate a frequency offset for the signal based on (i) the first offset measured at the measuring unit, and (ii) a second offset measured at the hub.

In still another exemplary embodiment, a computer readable media storing computer program instructions is provided. The computer executes the following instructions, measuring at the remote a first offset, receiving at the remote a second offset, and calculating a frequency offset at the remote, for receiving a signal from the another remote, based on (i) a first offset measured at the remote, and (ii) a second offset measured by the hub.

Another exemplary embodiment describes a method for communicating between peer remotes. The method includes measuring at the remote a first offset, receiving at the remote a second offset from a hub, and calculating a frequency offset at the remote, for receiving a signal from the another remote, based on (i) a first offset measured at the remote, and (ii) a second offset measured by the hub.

DESCRIPTION OF THE PREFERRED EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all implementations of the claimed features include the discussed feature, advantage or mode of operation.

In one exemplary embodiment, a star network and a mesh network may be combined by overlaying a mesh network on top of an existing star network. In this star/mesh configuration, the network control and cost saving benefits of a hub can be combined with the reduced propagation delay and satellite bandwidth cost savings of the mesh network. In such a satellite network, all remote terminals may use their own reference clock. Even if the reference clocks of the remote terminals are locked to a common source, each terminal may have its own frequency down conversion equipment that may introduce a frequency offset unique to the corresponding terminal. Thus, the inventors have identified a method that nulls out this frequency offset to enhance the ability of a terminal to demodulate a signal received from a peer terminal.

Figure 1:
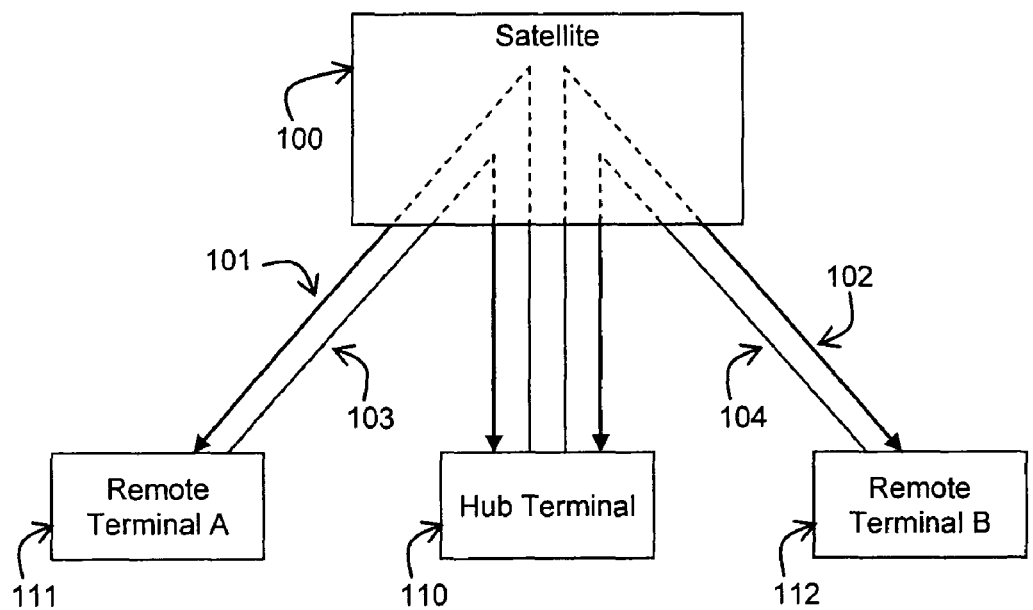
FIG. 1 shows an exemplary form of a star-shaped network.
Figure 2:
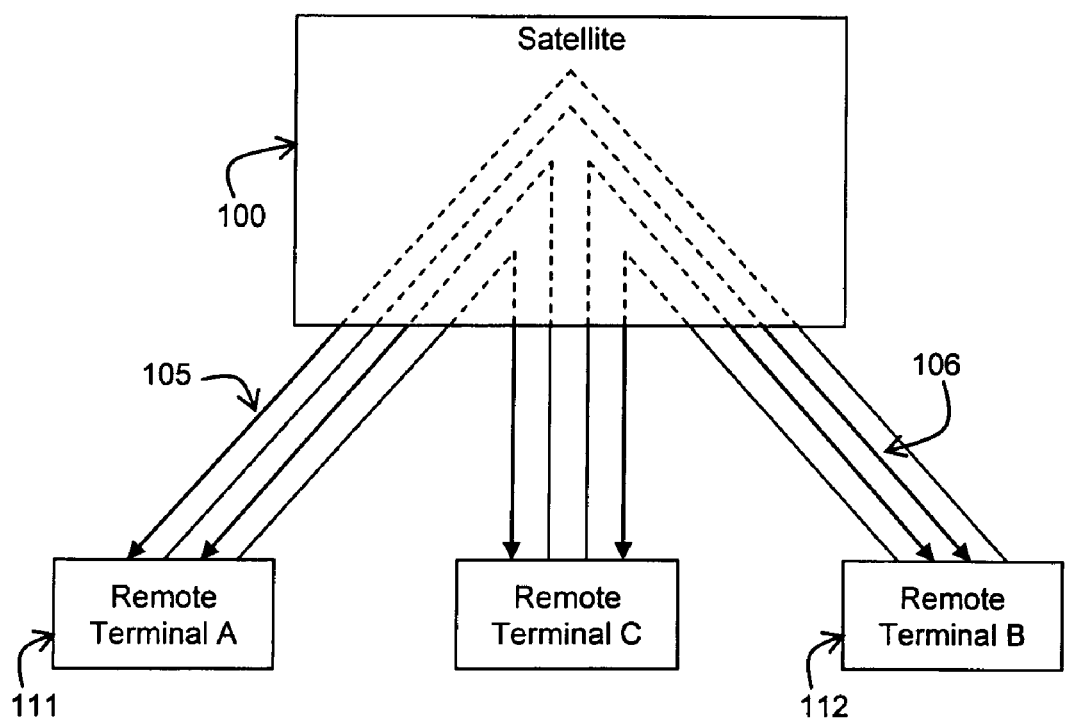
FIG. 2 shows an exemplary form of a mesh-shaped network.
Figure 3:
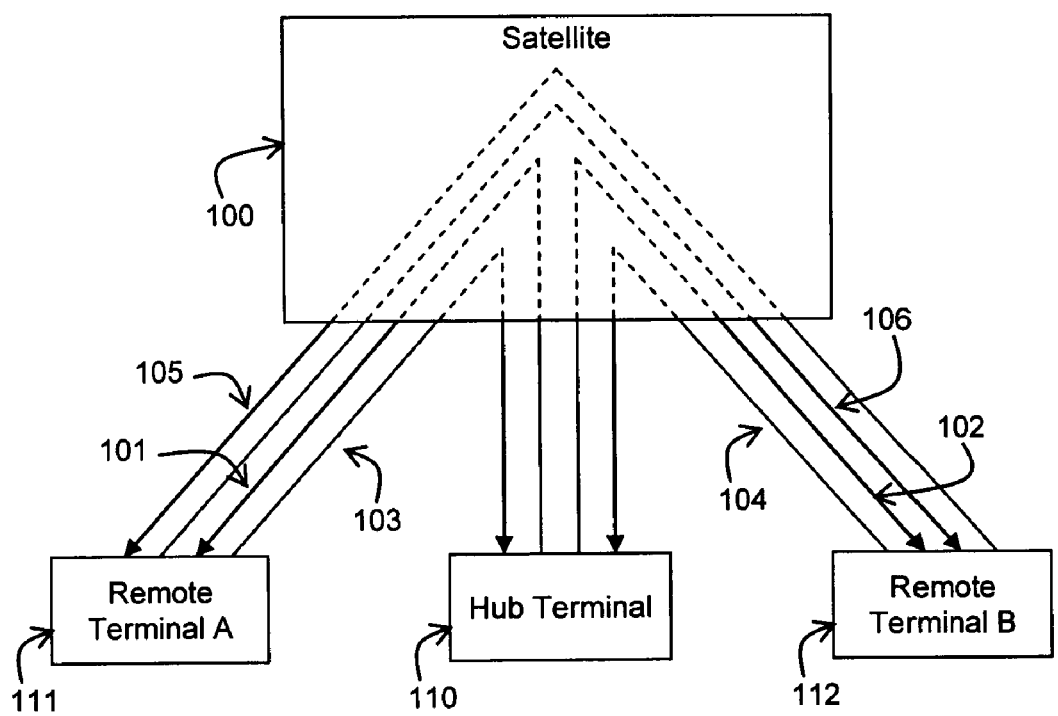
FIG. 3 shows an exemplary embodiment of a hybrid star/mesh network.

Referring now to the drawings, wherein like reference numerals designate identical or corresponding parts throughout the several views, and more particularly to FIG. 3 thereof, which shows an exemplary embodiment of a star/mesh network. In FIG. 3, one or more continuous broadcast channel, as for example a single channel per carrier (SCPC) signal or a standard DVB-S2 carrier, for example signals 101 and 102, may be used to communicate from hub 110 to terminals 111 and 112. A time division multiple access (TDMA) signal may used by each remote terminal to send information, for example signals 103 or 104 may be used to send information from respective remote terminals 111 and 112 to the hub 110, and signals 105 and 106 may be used to send information from one remote terminal to another remote terminal. The SCPC signal (e.g. 101,102) from the hub 110 may remain active constantly, allowing the remote terminal receivers to acquire this SCPC signal by sweeping the receive frequency.

When either of remote terminals 111 or 112 does not have access to a stable frequency reference, it may use the received SCPC (101,102) signal as a frequency reference. However, a condition change, such as a change in temperature, may cause the behavior of certain components to change, resulting in a significant frequency drift from the reference. One such component may be a dielectric resonator oscillator (DRO) low noise block downconverter (LNB). The resulting frequency drift may affect both the SCPC outbound signal and TDMA inbound signals, and can result in a peer remote terminal demodulator being unable to reliably recover data from the inbound channel.

Figure 4:
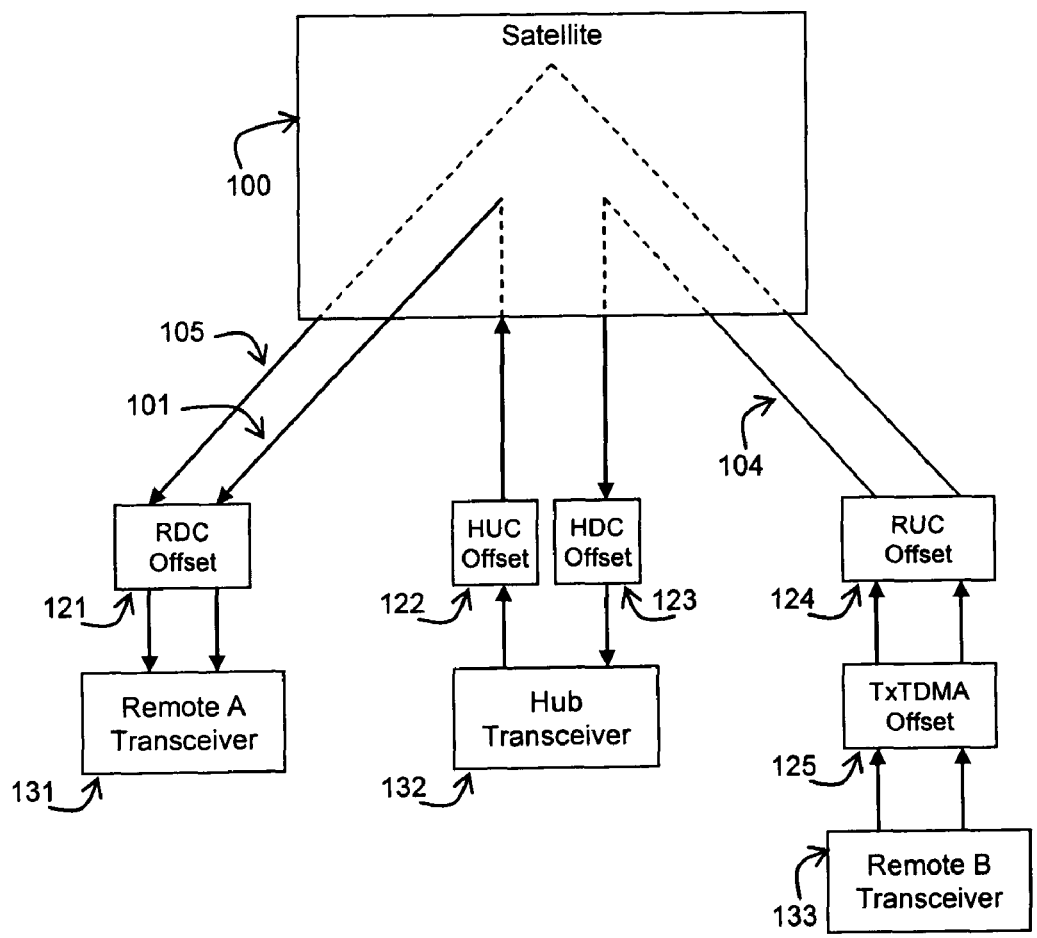
FIG. 4 shows exemplary communication paths and sources of frequency offset in a hybrid star/mesh network.

FIG. 4 is a block diagram showing another view of the embodiment in FIG. 3, identifying some sources of frequency offset for the following exemplary transmission paths: path 101 from hub 132 to remote A 131, path 104 from remote B 133 to hub 132, and path 105 from remote B 133 to remote A 131. The sources of frequency offset may include the remote upconverter (RUC) 124, the remote downconverter (RDC) 121, the hub upconverter (HUC) 122, the hub downconverter (HDC) 123, and the satellite 100.

In the following, four possible communication paths among the hub and the two illustrated remotes are discussed in order to determine a frequency offset at the receiver remote so that the receiver remote is able to communicate with the transmitter remote in TDMA not via the hub. In this regard, a star system requires that all the remotes adjust their transmit frequency offsets such that the bursts received at the hub are received with 0 offset. In a mesh configuration, the remotes use the same frequency offset to transmit to the mesh receivers and in this implementation the mesh receivers estimate the expected frequency offsets and adjust the offsets as will be discussed next. It is also shown next that the frequency offset at the mesh receiver is independent of the transmit offset (i.e., the transmit offset is set to null out the hub receiver offset).

Remote to Hub Signal

When the Hub receives a signal from the remote, the frequency offset perceived at the Hub 132 when a burst is transmitted from Remote B 133 is $$R_B H\text{Offset} = Tx TDMA\text{Offset} + RUC\text{Offset} + \text{SatelliteOffset} + HDC\text{Offset} \quad (1)$$

In equation (1), TxTDMAOffset is the frequency offset from a nominal frequency that the remote transmits (element 125 in FIG. 4 determines this offset), RUCOffset corresponds to the frequency offset introduced during the up conversion (unit 124) in the Remote B, Satellite Offset is the offset introduced at the satellite during Uplink/Downlink conversion, and HDCOffset is the offset introduced at the hub during the down conversion (unit 123).

The Hub 132 measures the $R_B H\text{Offset}$, which is defined as the offset from nominal frequency at the hub. The UCP control loop at the hub tries to null out the $R_B H\text{Offset}$ by commanding the Remote B to change the TxTDMAOffset so that $R_B H\text{Offset}=0$. Thus, $$Tx TDMA\text{Offset} + RUC\text{Offset} = -(\text{SatelliteOffset} + HDC\text{Offset}) \quad (1a)$$

since RHOffset is set to be 0. It is noted in equation (1a) that the right hand side is a constant of the system.

Hub to Hub Signal

Figure 5:
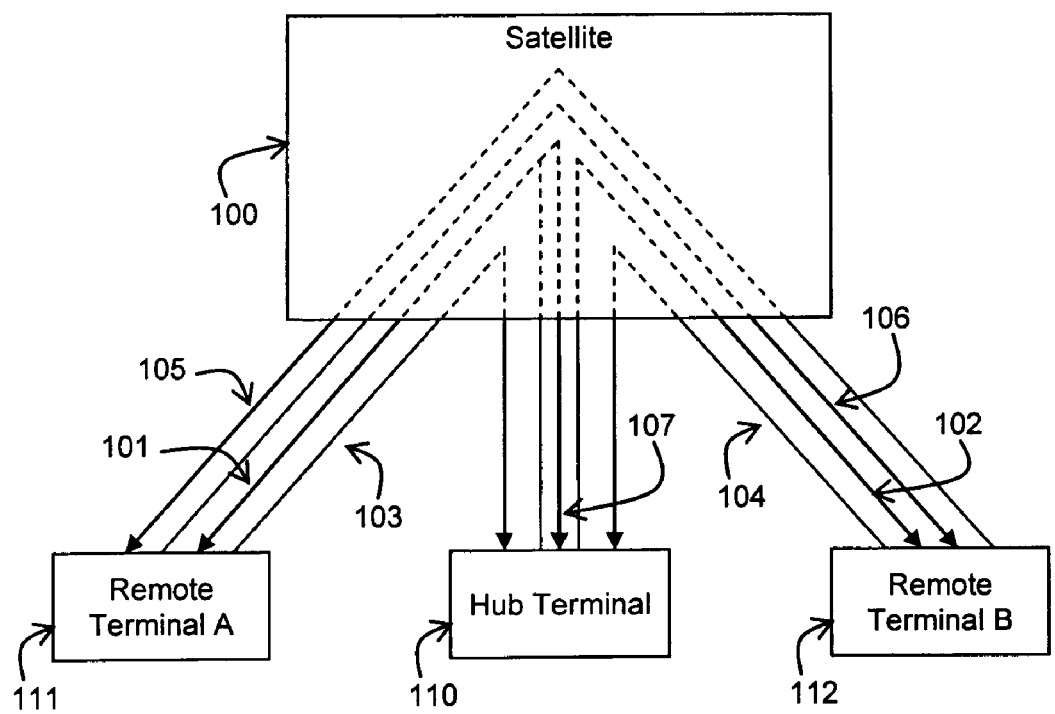
FIG. 5 shows an exemplary embodiment of a hybrid star/mesh network when the hub can receive its own transmission back from the satellite.

The frequency offset perceived at the hub in the loopback mode (i.e., a signal is transmitted from the hub to the repeater and back to the hub) is determined as follows. FIG. 5 is a block diagram of another exemplary embodiment, in which the hub terminal 110 may be able to receive one or more of its own SCPC signals through a return path 107 from the satellite. In this exemplary embodiment, the hub 110 can measure the combined frequency offsets of a hub upconverter, hub downconverter, and satellite transponder. Additionally, this offset may be used to help the remote terminals demodulate signals from peer remote terminals.

Thus, the frequency offset at the hub due to the loopback mode 107 is $$HH\text{Offset} = HUC\text{Offset} + \text{SatelliteOffset} + HDC\text{Offset} \quad (2)$$

Figure 6:
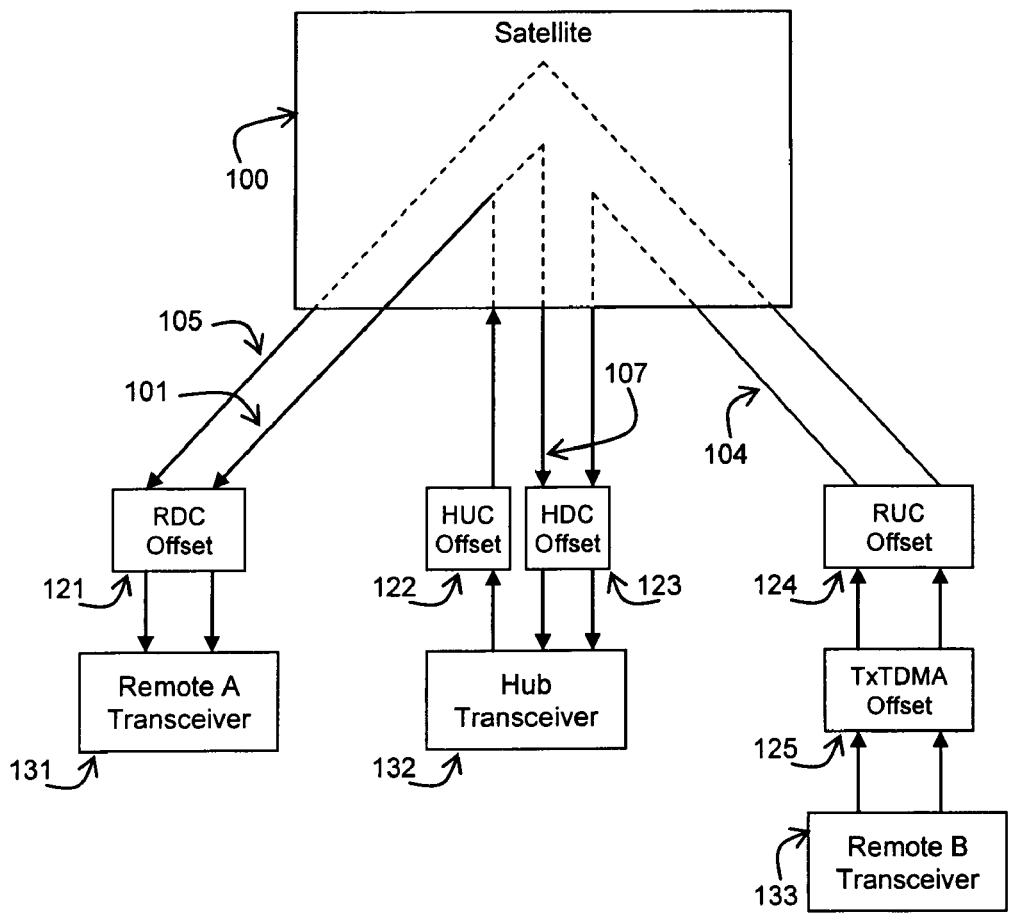
FIG. 6 shows exemplary communication paths and sources of frequency offset in a hybrid star/mesh network.

In this equation, HHOffset is the overall offset due to the loopback, HUCOffset is the offset introduced by the upconverter (122 in FIG. 4) of the hub, and HDCOffset is the offset introduced by the downconverter (123 in FIG. 4) of the hub. The upconverter and the down converter of the hub are also shown in FIG. 6. The HHOffset value is measured at the Hub 132 and is periodically broadcasted to all or part of the remotes.

Hub to Remote Signal

FIG. 5 also illustrates a path 101 that corresponds to the transmission of a signal from the Hub 110 to the Remote 111.

The frequency offset perceived at the Remote A from the Hub is $$HR_A\text{Offset} = HUC\text{Offset} + \text{SatelliteOffset} + RDC\text{Offset} \quad (3)$$

In equation (3), the $HR_A$Offset is the offset frequency for the signal sent by the Remote A to the Hub, HUCOffset is the offset frequency at the upconverter 122 of the Hub (see FIG. 6), and RDCOffset is the offset frequency at the downconverter 121 at the remote A (also shown in FIG. 6). The $HR_A$Offset value is measured at the remote A in this example. However, each remote may calculate its corresponding $HR_A$Offset.

Remote to Remote Signal

FIG. 6 shows another exemplary embodiment where more sources of frequency offset are depicted for the following exemplary transmission paths: path 101 from hub 132 to remote A 131, path 104 from remote B 133 to hub 132, path 105 from remote B 133 to remote A 131, and path 107 from hub 132 to hub 132. The sources of frequency offset may include the remote upconverter 124, the remote downconverter 121, the hub upconverter 122, the hub downconverter 123, and the satellite 100.

Another offset is present at one remote when communicating with another remote. For example, as shown in FIG. 6, path 105, Remote A may receive directly from Remote B a signal. In this situation, the frequency offset perceived at the Remote A 131 from Remote B 133 is $$R_BR_A\text{Offset} = TxTDMA\text{Offset} + RUC\text{Offset} + \text{Satellite Offset} + RDC\text{Offset} \quad (4)$$

In this equation, $R_BR_A$Offset is the offset frequency that Remote A has to determine to be able to communicate with Remote B. Substituting for TxTDMAOffset+RUCOffset=−(SatelliteOffset+HDCOffset) as determined in equation (1a), equation (4) becomes $$R_BR_A\text{Offset} = -(\text{SatelliteOffset} + HDC\text{Offset}) + \text{SatelliteOffset} + RDC\text{Offset} \quad (5)$$

Adding and subtracting HUCOffset on each side of equation (5), the following equation is obtained:

$$R_BR_A\text{Offset} = -(\text{SatelliteOffset} + HUC\text{Offset} + HDC\text{Offset}) + HUC\text{Offset} + \text{SatelliteOffset} + RDC\text{Offset} \quad (6)$$

When combining this equation with equations (2) and (3), the following equation is obtained:

$$R_BR_A\text{Offset} = HR_A\text{Offset} - HH\text{Offset} \quad (7)$$

As discussed above, the $HR_A$Offset is measured at the receiving remote and HHOffset is measured at the Hub and broadcasted to the remotes. Thus, based on equation (7), the Remote A, in order to communicate directly with the Remote B without the Hub, uses the measured $HR_A$Offset (first offset) and HHOffset (second offset) for calculating $R_BR_A$Offset. It is noted that the $R_BR_A$Offset offset is independent of the parameters of the transmit Remote B and is estimated at each local remote. Since each remote knows both these quantities, each remote is capable of adjusting the own receiver frequency by the frequency offset RROffset so that each remote can receive bursts from other remotes.

Each remote may determine RROffset according to the following method. The hub first determines HHOffset directly by measuring a frequency offset of a message along a path 107 that it transmits and receives. Periodically, the hub sends each remote an updated HHOffset value. Further, each remote calculates a value for HROffset based upon a signal sent from the hub and received at the remote as described in the Hub to Remote signal section. Based on the received HHOffset and the measured HROffset, the receiving remote calculates, at the remote side, the RROffset and adjusts the receiving time of the receiver with the calculated RROffset value to communicate with the another remote.

In this way, it is noted that in a mesh network, a remote is capable of directly communicating with the another remote without directing the exchange data through the hub.

Figures 7, 8:
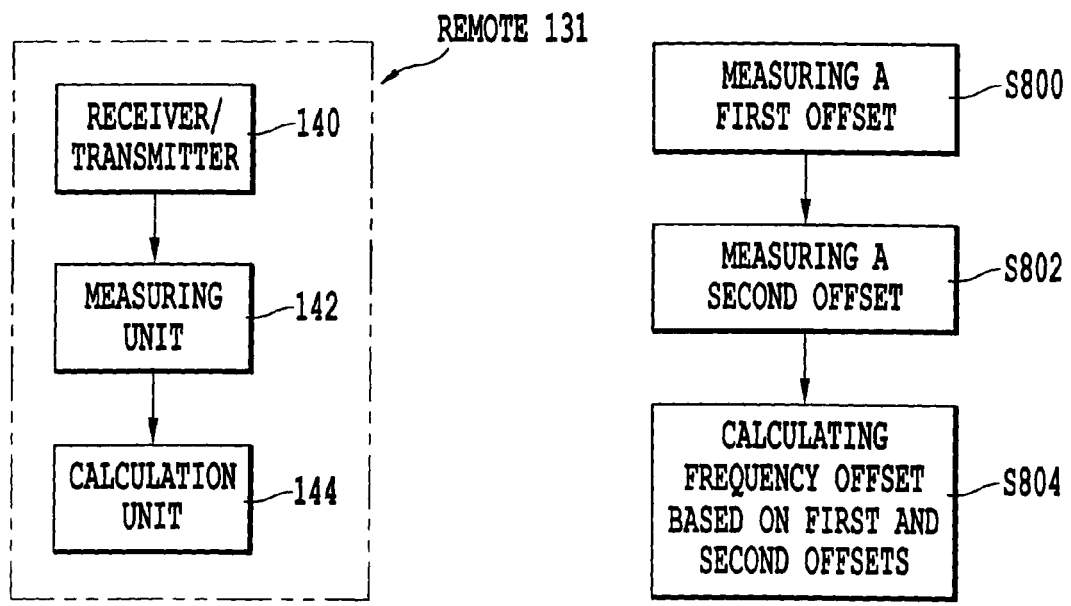
FIG. 7 shows a remote that includes a calculation unit, a measuring unit, and a transceiver.
FIG. 8 shows steps of a method for calculating a frequency offset.

FIG. 7 schematically indicates a receiver/transmitter 140 (transceiver) of the remote 131, a measuring unit 142 and a calculation unit 144. The transceiver 140 receives the signal from the another remote and also the second offset from the hub, the measuring unit measures the first offset, and the calculation unit, based on the first and second offsets, calculates the frequency offset. FIG. 7 shows an exemplary remote but it would be appreciated by one of ordinary skill in the art that the remote 131 may include other units and components and also the remote 131 may be implemented in software or in a dedicated circuitry, as a microprocessor.

FIG. 8 shows various steps of a method for calculating the frequency offset implemented on the above discussed remote. The remote measures in S800 a first offset, receives in S802 a second offset, and calculates in S804 the frequency offset based on the first and second offsets.

Figure 9:
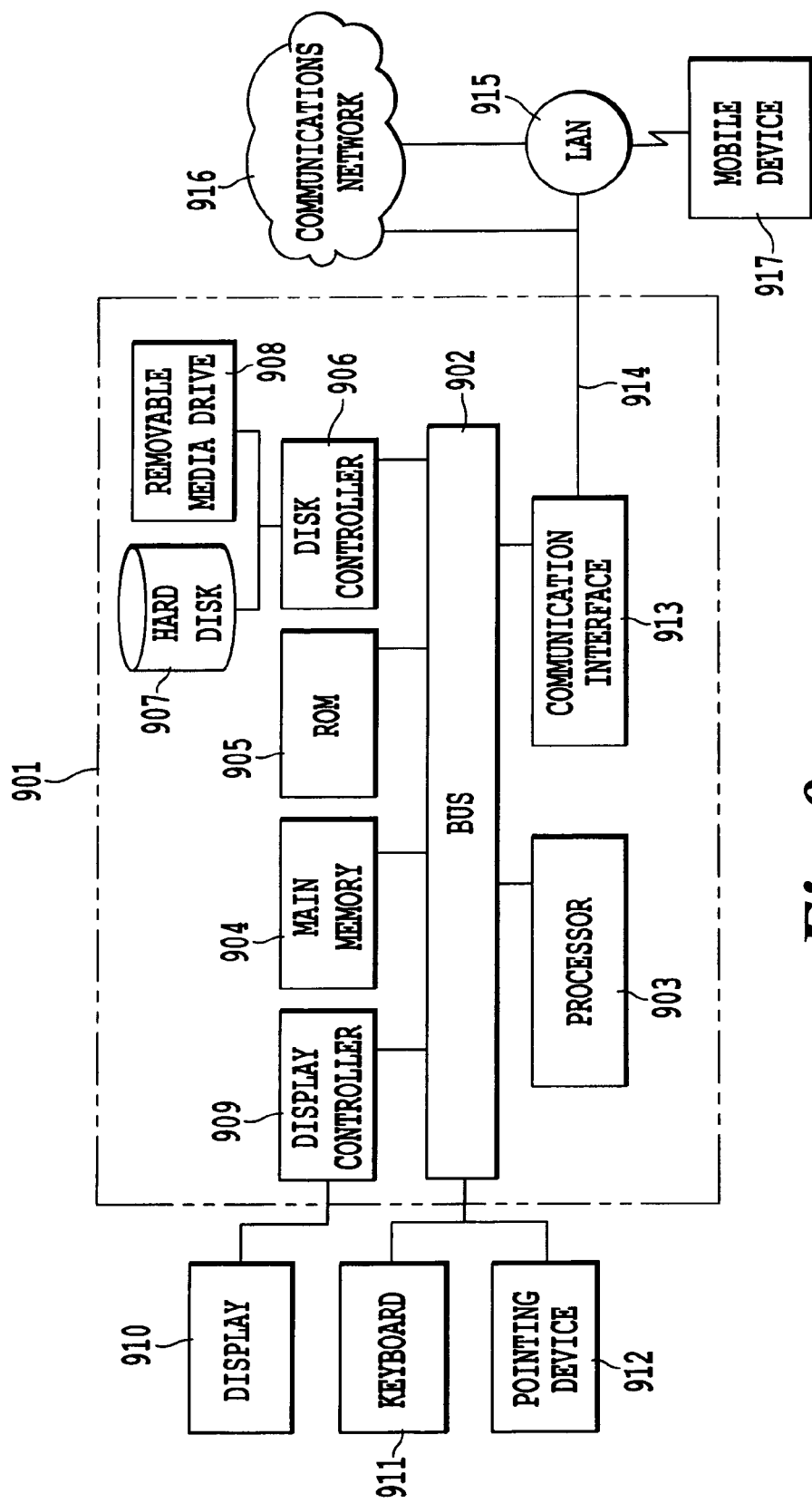
FIG. 9 shows a diagram illustrating a general computer that a remote or a hub uses in one embodiment of the present invention.

FIG. 9 illustrates one possible computer system 901 upon which an embodiment of the present invention may be implemented. However, one of ordinary skill in the art would appreciate that any computational system, portable or not, is appropriate to one or more embodiments of the present invention. The computer system 901 includes a bus 902 or other communication mechanism for communicating information, and a processor 903 coupled with the bus 902 for processing the information. The computer system 901 also includes a main memory 904, such as a random access memory (RAM) or other dynamic storage device (e.g., dynamic RAM (DRAM), static RAM (SRAM), and synchronous DRAM (SDRAM)), coupled to the bus 902 for storing information and instructions to be executed by processor 903. In addition, the main memory 904 may be used for storing temporary variables or other intermediate information during the execution of instructions by the processor 903. The computer system 901 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 901 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 901 may also include a display controller 909 coupled to the bus 902 to control a display 910, such as a cathode ray tube (CRT), for displaying information to a computer user. The computer system includes input devices, such as a keyboard 911 and a pointing device 912, for interacting with a computer user and providing information to the processor 903. The pointing device 912, for example, may be a mouse, a trackball, or a pointing stick for communicating direction information and command selections to the processor 903 and for controlling cursor movement on the display 910. In addition, a printer may provide printed listings of data stored and/or generated by the computer system 901.

The computer system 901 performs a portion or all of the processing steps of the invention in response to the processor 903 executing one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 901, for driving a device or devices for implementing the invention, and for enabling the computer system 901 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 903 for execution. A computer readable medium may take many forms, including but not limited to, non-volatile media, volatile media, and transmission media. Non-volatile media includes, for example, optical, magnetic disks, and magneto-optical disks, such as the hard disk 907 or the removable media drive 908. Volatile media includes dynamic memory, such as the main memory 904. Transmission media includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 903 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 901 may receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 904, from which the processor 903 retrieves and executes the instructions. The instructions received by the main memory 904 may optionally be stored on storage device 907 or 908 either before or after execution by processor 903.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a network interface card to attach to any packet switched LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc). The signals through the various networks and the signals on the network link 914 and through the communication interface 913, which carry the digital data to and from the computer system 901 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

Based on the above description of a computer, in one embodiment, the hub and/or the remote include one or more components of the computer of FIG. 9 and the memory can be used to store the measured values, and the microprocessor can measure the hub to remote offset, and calculate the frequency offset.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that numerous modifications and variations of the present invention are possible in light of the above teachings. It is therefore to be understood that within the scope of the appended claims, the invention may be practiced otherwise than as specifically described herein.

The invention claimed is:

1. A star/mesh communication system comprising:
a hub;
a repeater; and
first and second remotes, wherein
the first remote is configured to transmit a first signal to the hub via the repeater, the first signal being received at the hub with a frequency offset of RHOffset, as follows $RH\text{Offset}=Tx TDMA\text{Offset}(1)+RUC\text{Offset}+\text{Satellite Offset}+HDC\text{Offset}$ wherein TxTDMAOffset(1) is a frequency offset from a nominal frequency used by the first remote, RUCOffset is a frequency offset introduced during an up-conversion in the first remote, SatelliteOffset is a frequency offset introduced at the repeater during Uplink/Downlink conversion, and HDCOffset is a frequency offset introduced at the hub during a down conversion,
the hub is further configured to command the first remote to change the value of TxTDMAOffset(1) to TxTDMAOffset(2) so that RHOffset=0, as follows $Tx TDMA\text{Offset}(2)=-(\text{SatelliteOffset}+HDC\text{Offset})-RUC\text{Offset},$ the hub is further configured to transmit a second signal to the repeater to be received back at the hub in a loopback mode, the second signal being received at the hub with a frequency offset of HHOffset, as follows $HH\text{Offset}=HUC\text{Offset}+\text{SatelliteOffset}+HDC\text{Offset}$ wherein HUCOffset is a frequency offset introduced during an up-conversion in the hub, and HDCOffset is a frequency offset introduced during a down-conversion in the hub;
the hub is further configured to periodically calculate and transmit the value of HHOffset to the first and second remotes,
the hub is further configured to transmit a third signal to the second remote via the repeater, the third signal being received at the second remote, which measures a frequency offset of the third signal HROffset, as follows $HR\text{Offset}=HUC\text{Offset}+\text{SatelliteOffset}+RDC\text{Offset}$ wherein RDCOffset is a frequency offset introduced during down-conversion in the second remote,
the second remote is configured to transmit a fourth signal to the first remote via the repeater, and
prior to receiving the fourth signal, the first remote is configured to estimate a frequency offset RROffset of the fourth signal received from the second remote via the repeater, using values determined from previous star/mesh communication signals, as follows $RR\text{Offset}=HR\text{Offset}-HH\text{Offset}.$ 2. The communication system of claim 1, wherein the repeater includes an earth orbit satellite.

3. The communication system of claim 1, wherein the first remote directly communicates via the repeater with the second remote based on the estimated frequency offset RROffset.

4. The communication system of claim 1, wherein the frequency offset RROffset is estimated using a continuous broadcast channel and the first remote communicates with the second remote by Time Division Multiple Access (TDMA).

5. A remote that communicates in a star/mesh communication system with another remote via a repeater and also communicates with a hub, the remote comprising:
a transceiver configured to transmit a first signal to the hub via a repeater, the first signal being received at the hub with a frequency offset of RHOffset, as follows $RH\text{Offset}=Tx TDMA\text{Offset}(1)+RUC\text{Offset}+\text{Satellite Offset}+HDC\text{Offset}$ wherein TxTDMAOffset(1) is a frequency offset from a nominal frequency used by the remote, RUCOffset is a frequency offset introduced during an up-conversion in the remote, SatelliteOffset is a frequency offset introduced at the repeater during Uplink/Downlink conversion, and HDCOffset is a frequency offset introduced at the hub during a down conversion;
the remote further configured to receive a command from the hub to change the value of TxTDMAOffset(1) to TxTDMAOffset(2) so that RHOffset=0, as follows $Tx TDMA\text{Offset}(2)=-(\text{SatelliteOffset}+HDC\text{Offset})-RUC\text{Offset};$ the remote is further configured to periodically receive a frequency offset value HHOffset from the hub, which is calculated by the hub in a loopback mode, as follows $HH\text{Offset}=HUC\text{Offset}+\text{SatelliteOffset}+HDC\text{Offset}$ wherein HUCOffset is a frequency offset introduced during an up-conversion in the hub, and HDCOffset is a frequency offset introduced during a down-conversion in the hub;
the remote is further configured to receive a second signal from the hub via the repeater, and configured to measure a frequency offset of the second signal HROffset, as follows $HR\text{Offset}=HUC\text{Offset}+\text{SatelliteOffset}+RDC\text{Offset}$ wherein RDCOffset is a frequency offset introduced during down-conversion in the remote;
the transceiver further configured to receive, via the repeater, a third signal from the another remote, and prior to receiving the third signal, estimate a frequency offset RROffset of the third signal, as follows $RR\text{Offset}=HR\text{Offset}-HH\text{Offset}.$ 6. The remote of claim 5, wherein the transceiver is further configured to transmit the first signal to the hub via the repeater that includes an earth orbit satellite.

7. The remote of claim 5, wherein the remote directly communicates via the repeater with the another remote based on the estimated frequency offset RROffset.

8. The remote of claim 5, wherein the frequency offset RROffset is estimated using Single Channel Per Carrier (SCPC) and the remote communicates with the another remote by Time Division Multiple Access (TDMA).

9. A non-transitory computer readable media storing computer program instructions, which when executed by a computer in a remote cause the remote to communicate in a star/mesh communication system with another remote via a repeater and also with a hub via the repeater, including steps comprising: transmitting a first signal to the hub via a repeater, the first signal being received at the hub with a frequency offset of RHOffset, as follows RHOffset=TxTDMAOffset(1)+RUCOffset+SatelliteOffset+HDCOffset wherein TxTDMAOffset(1) is a frequency offset from a nominal frequency used by the remote, RUCOffset is a frequency offset introduced during an up-conversion in the remote, SatelliteOffset is a frequency offset introduced at the repeater during Uplink/Downlink conversion, and HDCOffset is a frequency offset introduced at the hub during a down conversion; receiving a command from the hub to change the value of TxTDMAOffset(1) to TxTDMAOffset(2) so that RHOffset=0, as follows TxTDMAOffset(2)=−(SatelliteOffset+HDCOffset)−RUCOffset; periodically receiving a frequency offset value HHOffset from the hub, which is calculated by the hub in a loopback mode, as follows HHOfset=HUCOffset+SatelliteOffset+HDCOffset wherein HUCOffset is a frequency offset introduced during an up-conversion in the hub, and HDCOffset is a frequency offset introduced during a down-conversion in the hub; receiving a second signal from the hub via the repeater; measuring a frequency offset of the second signal HROffset, as follows HROffset=HUCOffset+SatelliteOffset+RDCOffset wherein RDCOffset is a frequency offset introduced during down-conversion in the remote; receiving, via the repeater, a third signal from the another remote; and prior to receiving the third signal, estimating a frequency offset RROffset of the third signal, as follows RROffset=HROffset−HHOffset.

10. The computer readable media of claim 9, including further instructions causing steps comprising:
transmitting the first signal to the hub via the repeater that includes an earth orbit satellite.

11. The computer readable media of claim 9, including further instructions causing steps comprising:
connecting the remote directly, via the repeater, to the another remote based on the estimated frequency offset RROffset.

12. The computer readable media of claim 9, including further instructions causing steps comprising:
estimating the frequency offset RROffset using Single Channel Per Carrier (SCPC) and communicating with the another remote by Time Division Multiple Access (TDMA).

13. A method for peer remote communications in a star/mesh communication system between a first remote and a second remote via a repeater, the method comprising:
transmitting a first signal to the hub via a repeater, the first signal being received at the hub with a frequency offset of RHOffset, as follows $RH$Offset=$TxTDMA$Offset(1)+$RUC$Offset+Satellite Offset+$HDC$Offset wherein TxTDMAOffset(1) is a frequency offset from a nominal frequency used by the remote, RUCOffset is a frequency offset introduced during an up-conversion in the remote, SatelliteOffset is a frequency offset introduced at the repeater during Uplink/Downlink conversion, and HDCOffset is a frequency offset introduced at the hub during a down conversion;

receiving a command from the hub to change the value of TxTDMAOffset(1) to TxTDMAOffset(2) so that RHOffset=0, as follows $TxTDMA$Offset(2)=−(SatelliteOffset+$HDC$Offset)−$RUC$Offset;

periodically receiving a frequency offset value HHOffset from the hub, which is calculated by the hub in a loopback mode, as follows $HH$Ofset=$HUC$Offset+SatelliteOffset+$HDC$Offset wherein HUCOffset is a frequency offset introduced during an up-conversion in the hub, and HDCOffset is a frequency offset introduced during a down-conversion in the hub;

receiving a second signal from the hub via the repeater;
measuring a frequency offset of the second signal HROffset, as follows $HR$Offset=$HUC$Offset+SatelliteOffset+$RDC$Offset wherein RDCOffset is a frequency offset introduced during down-conversion in the remote;

receiving, via the repeater, a third signal from the another remote; and prior to receiving the third signal, estimating a frequency offset RROffset of the third signal, as follows $RR$Offset=$HR$Offset−$HH$Offset.

\* \* \* \* \*